J. D. WATSON.
STADIA ROD ATTACHMENT.
APPLICATION FILED JAN. 29, 1921.
1,428,669.
Patented Sept. 12, 1922.
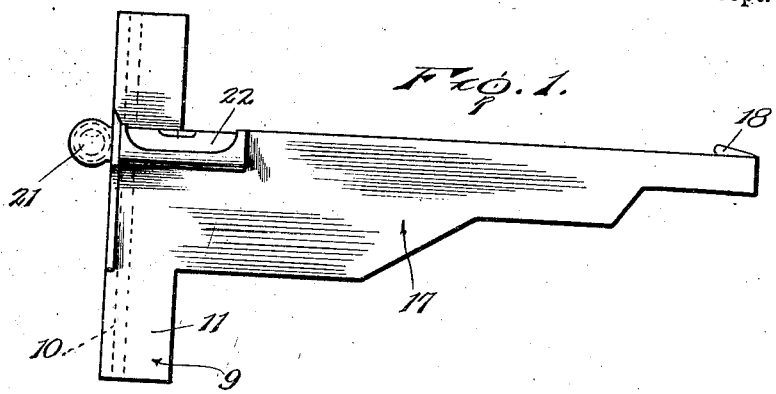
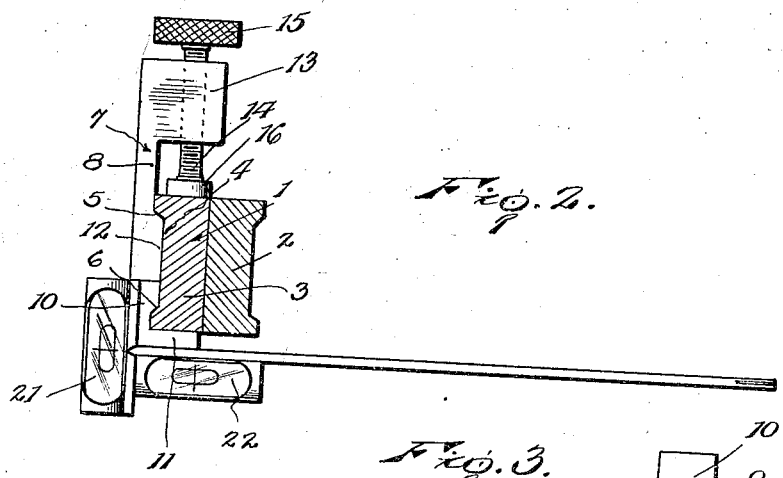
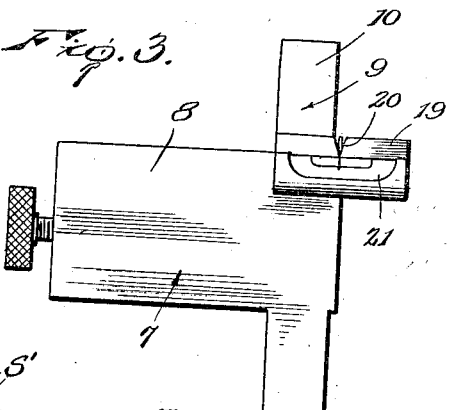
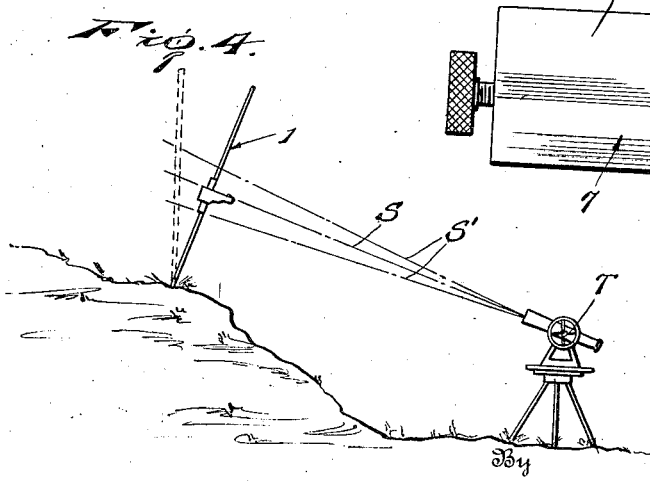
Inventor
J. D. Watson.
By Lacy & Lacy, Attorneys Patented Sept. 12, 1922.

1,428,669

UNITED STATES PATENT OFFICE.

JOHN D. WATSON, OF LAKE CITY, CALIFORNIA.

STADIA-ROD ATTACHMENT.

Application filed January 29, 1921. Serial No. 441,092.

*To all whom it may concern:*

Be it known that I, JOHN D. WATSON, a citizen of the United States, residing at Lake City, in the county of Modoc and State of California, have invented certain new and useful Improvements in Stadia-Rod Attachments, of which the following is a specification.

This invention relates to improvements in surveying instruments and more particularly to an improved stadia rod or attachment therefor. In surveying by the use of a stadia rod, it is customary to set the rod in true plumb position whether it and the transit be on a common level or on different levels. Where the rod and transit are on the same level the transit reading requires no correction for in this instance the length of the rod visible between the hairs of the transit telescope is in true ratio to the distance of the stadia rod from the transit. However when the stadia rod is to be set up at a higher elevation than the transit, and the rod is disposed perpendicularly or plumb, as is usual, a greater length of the rod will be visible, than if the rod and instrument were on the same level and correspondingly spaced. Therefore under these conditions and also where the transit requires to be sighted down grade to take a reading from the rod at a lower elevation, it is necessary to either make reference to a table provided for the purpose or to calculate by formula, in order to compensate for the difference in elevation of the rod and transit and thus correct the reading. It is evident however that by this method of procedure errors are liable to be made to say nothing of the time consumed in correcting the readings. It is therefore the primary object of the present invention to provide a stadia rod or an attachment for such a rod by the use of which accurate readings may be taken, in every instance, in the first place thereby dispensing with the necessity of making calculations to correct readings which must of necessity be inaccurate.

As previously stated the invention contemplates the provision of means whereby a stadia rod may be accurately positioned, by the rodman, in every instance at right angles to the line of sight or axis of the transit telescope so that regardless of variations in elevation of the rod and transit, an accurate reading may be immediately obtained.

More specifically the invention contemplates the provision upon the stadia rod of a sighting means aligned at right angles to the length of the rod and adapted to be employed by the rodman to be brought into line with the line of sight or axis of the transit telescope at which time the stadia rod will be in position at right angles to said line of sight.

While the invention contemplates broadly the provision of means for accomplishing the results above outlined, it also has as its object to provide a most efficient means for the purpose and one which will insure of accurate positioning of the stadia rod.

In the accompanying drawings:

Figure 1 is a side elevation of the instrument embodying the invention;

Figure 2 is a top plan view thereof, the instrument being illustrated as mounted upon a stadia rod which is shown in section;

Figure 3 is a rear elevation of the instrument; and

Figure 4 is a diagrammatic view illustrating the manner of using the instrument.

The present invention contemplates the provision, upon a stadia rod, of a sighting means aligned at right angles to the length of the rod, whether the means be permanently fixed upon the rod and in the nature of an integral or component part thereof, or whether it be in the form of an atachment which may be applied to any standard stadia rod. Therefore while the accompanying drawings illustrate an instrument attachable to a well known type of stadia rod and embodying the principles of the invention, it will be understood that this illustration is to be taken merely as an exemplification of the principles of the invention and I am not to be limited to the employment of the specific structure herein shown and described.

In the drawings the numeral 1 indicates in general a stadia rod comprising the usual sections 2 and 3, the section 2 being the adjustable front section and the section 3 being the one which is relatively stationary in the use of the rod. The instrument illustrated in the drawings and embodying the invention is particularly designed for application to a stadia rod of this type but it will be understood that if required the instrument may be modified to adapt it for application to other types of stadia rods, or the essential component elements of the instrument with or without modification may be embodied directly in the rod structure. In the particular type of rod illustrated in Figure 2, the rear face of the section 3 of the rod is formed with a longitudinal recess or channel 4 providing ribs 5 and 6 located at the opposite sides of the said rear face of the section. The instrument comprises an attaching member which is indicated in general by the numeral 7 and which comprises a plate 8 provided at one side with a vertically disposed head 9 having wings 10 and 11 designed to rest respectively against the rear face of the section 3 and the right hand side face of said section as clearly shown in Figure 2 of the drawings, the forward face of the plate 8 and the corresponding face of the wing 10 being formed with a boss 12 to seat within the recess 4 and at its opposite sides against the ribs 5 and 6. At its opposite side the plate 8 is formed or provided upon its front face with a boss 13 through which is threaded a clamping screw 14 having a milled head 15 whereby it may be rotatably adjusted to bind against the left hand side face of the rod section 3, the end of the clamping screw which coacts with the said rod section being preferably provided with a tip 16 of rubber or other material suitable for the purpose. It will be evident at this point that the clamping screw 14 constitutes means for securely clamping the attaching member of the instrument upon the rod section 3 and that the instrument may be adjusted to any desired position in the length of the said rod section, the adjustment, in any event, being such that the sights of the instrument will be at the same elevation as the axis of the transit telescope when the rod and transit are placed on a common level.

The numeral 17 indicates a sighting arm which extends forwardly from the wing 11 of the head 9 and occupies a plane parallel to the right hand side of the rod 1 when the instrument is properly mounted and placed upon the rod, and this arm is provided upon its upper edge at its forward end with a sight 18 which may be of the thin blade type or of any other type found suitable for the purpose and which upstands a short distance above the upper edge of the arm 17. A beveled sight leaf 19 is provided at the rear end of the arm 17 or more specifically outstands laterally from the side of the wing 11 of the head 9 and is formed with a sighting notch 20 in alignment with the upper edge of the said arm 17 and the sight 18. A spirit level 21 is mounted at the rear of the sight leaf 19, and a spirit level 22 is positioned at right angles to the level 21 and beside the arm 17.

Referring to Figure 4 of the drawings the reference letter T indicates the ordinary transit employed in surveying in connection with the stadia rod 1. Under the conditions illustrated in this figure the stadia rod requires to be set up at a higher elevation than the transit. The line of sight of the transit telescope is indicated by the reference letter S, and the lines S' above and below the line S intersect the hairs of the transit telescope. When the stadia rod 1 is disposed in true vertical position as shown in dotted lines in the said figure it will be at other than a right angle to the line of sight S and therefore the upper line S' will intersect the rod at a point a greater distance from the point of intersection of the line S with the rod than the point of intersection of the lower line S' with the said rod. However by the use of the device embodying the invention, the rodman may accurately position the rod at right angles to the line of sight S and as shown in full lines in the said Figure 4 so that the lines S' will intersect the rod at points equi-distantly spaced from the point of intersection from the line S with the said rod and thus an accurate reading is directly obtained and the necessity for making calculations or referring to correction tables is avoided. In using the instrument, the rodman will sight along the arm 17 until the sight notch 20 and sight 18 are in true alignment with the axis of the telescope lens or as nearly in alignment as it is practical for the rodman to bring the instrument, and at such time he will observe the bubble in the spirit level 21 the position of which will indicate when the rod is in a vertical plane with the line of sight of the transit. Inasmuch as the spirit level is located directly in rear of and close to the sight notch 20, the rodman will be enabled to observe the bubble in the said level, the sight notch 20 and the sight 18 simultaneously.

Having thus described the invention what is claimed as new is:

1. The combination with a stadia rod, of a member mounted thereon and provided with front and rear sights aligned at a right angle to the rod, and a level indicating means located in juxtaposition to one of said sighting elements.

2. An instrument of the class described comprising a member provided with spaced sighting elements, and a level indicating means associated with the member in juxtaposition to one of said elements.

3. An instrument of the class described comprising a member attachable to a stadia rod, an arm extending from the member, spaced sighting elements upon the arm, and a level indicating means in juxtaposition to one of said elements.

4. An instrument of the class described comprising a member attachable to a stadia rod, an arm extending from the member, spaced sighting elements upon the arm, level indicating means associated with one of said sighting elements to extend transversely with relation to the rod in the applied position of the instrument, and a second level indicating means positioned at right angles to first mentioned means.

In testimony whereof I affix my signature.

JOHN D. WATSON. [L. S.]